Dec. 2, 1947. D. N. CROSTHWAIT, JR., ET AL 2,431,790
BALANCED RESISTANCE TYPE TEMPERATURE CONTROL APPARATUS
Filed Aug. 2, 1940 4 Sheets-Sheet 3

Inventors
David N. Crosthwait Jr.
and Everett W. Werts
By Barnett & Truman
Attorneys

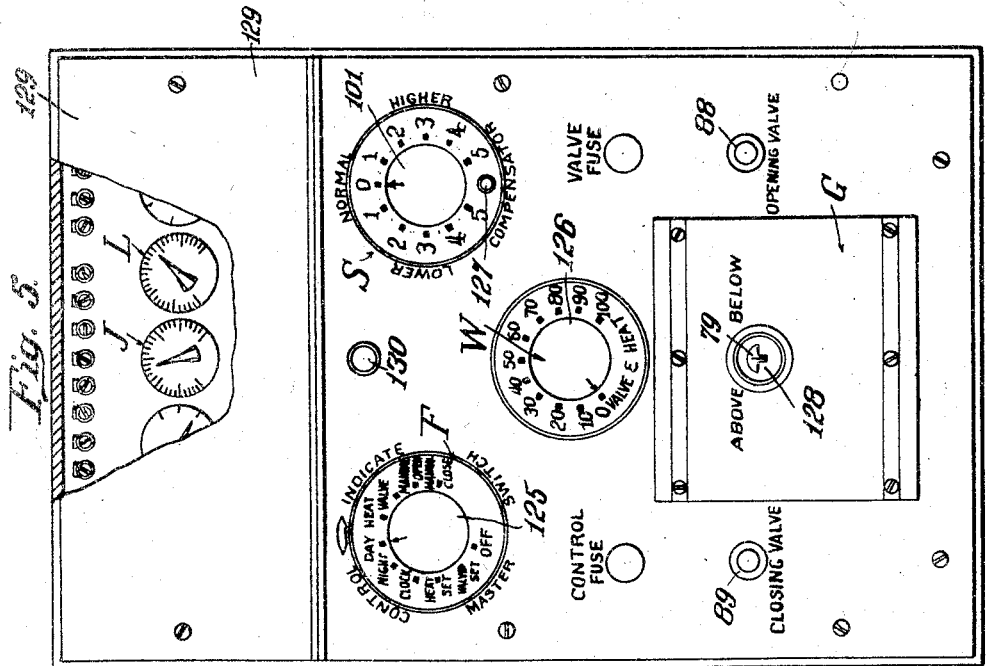
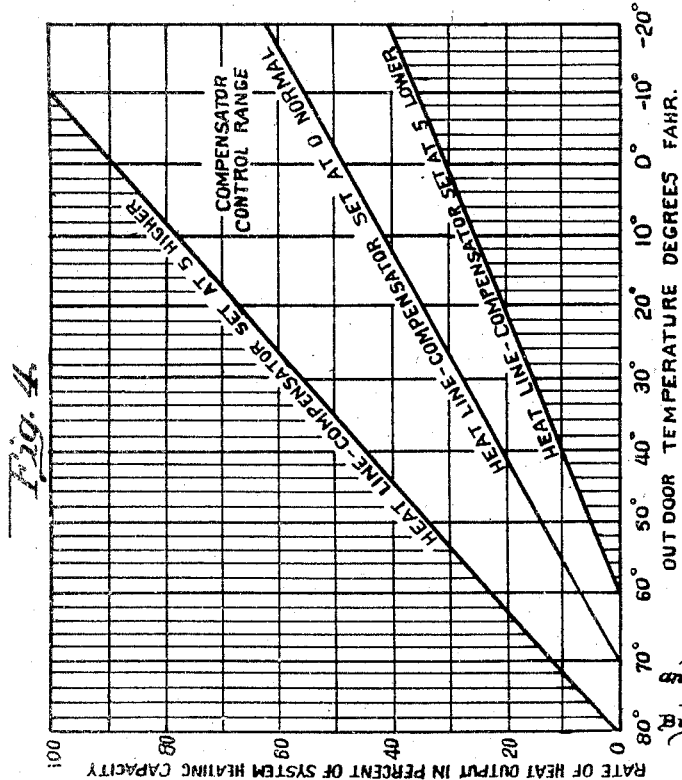

Patented Dec. 2, 1947

2,431,790

UNITED STATES PATENT OFFICE 2,431,790

BALANCED RESISTANCE TYPE TEMPERATURE CONTROL APPARATUS

David N. Crosthwait, Jr., Chicago, Ill., and Everett W. Werts, Michigan City, Ind., assignors to C. A. Dunham Company, Marshalltown, Iowa, a corporation of Iowa Application August 2, 1940, Serial No. 349,394

4 Claims. (Cl. 236—91)

This invention relates to certain new and useful improvements in a balanced resistance type temperature controlling apparatus, and more particularly to a system which modulates the flow of steam or other heating medium to a heating system in accordance with existing temperature conditions both inside and outside of the heated space, and also permits indications to be obtained at a central point showing the setting of the valve, rate of heat output, and other useful data. The particular mechanism hereinafter described by way of example adjusts a central control valve for modulating or proportioning the flow of steam to a steam heating system, but the control mechanism could be adapted for the adjustment of automatic combustion devices or other apparatus for regulating the heat supply.

This improved control system is based upon the principle of the variation in the resistance of a metallic conductor in response to temperature changes. The principle is applied by the use of temperature sensitive resistance windings in Wheatstone bridge circuits to operate a sensitive galvanometer relay, which in turn controls the setting of a motorized valve. The Wheatstone bridge comprises a multiplicity of arms which are cooperatively arranged and connected in the bridge, and some of which are used alternatively, so as to effect a plurality of different controls or indications. The bridge comprises a plurality of branches, each branch consisting of a pair of series connected arms. The branches are arranged in parallel and the galvanometer relay is connected across the junctures of the several branches, that is in parallel with the branches. The electric power is connected across the junctures of the several pairs of arms. The bridge comprises a plurality of fixed resistances in the several arms, some of these resistances being permanent and some adjustable. There are also resistances in the junctures between the arms, the branch circuits connecting these junctures being adjustably connected in these junction resistances so as to selectively split these resistances between the two arms. There are also several temperature sensitive resistances in certain of the arms at one side of the bridge which act to balance or unbalance the bridge as the controlling temperatures and heat output change. There is also a mechanically adjusted resistance in the juncture of the arms in a branch at the other side of the bridge which is adjusted proportionately to the valve setting and always tends to rebalance the bridge as the valve is adjusted.

The galvanometer which controls the relay which adjusts the valve is also used at times as a null point indicator. There are no moving parts in the thermally responsive elements which are all in the form of substantially fixed resistance windings.

The rate of steam supply is regulated in steps, with a short pause after each step permitting the corresponding change in the rate of steam supply to take effect, and after the valve opening has been corrected by an amount proportional to the temperature deviation from the predetermined level, the control stands by until such time as the need for another correction is detected.

The controlling temperature is not measured directly by an inside or room thermostat, but a temperature sensitive resistance winding mounted on the inside surface of a pane of window glass reacts to the inner surface temperature of the glass as a measure of the heat requirements of the building as determined by prevailing outdoor weather conditions, and also reacts less promptly to inside air temperature changes and the mean radiant temperature of interior parts of the building. A pair of temperature resistance sensitive windings, one mounted below and the other above the heating elements, in a convector type of heating unit react to the rise in temperature of an air stream passing through this heating element as a measure of the rate of heat output from the heating system, that is the supply provided to correct or balance the temperature. The original fixed adjustments of the bridge are such that the bridge will be balanced provided the heat output is correct to satisfy the heat requirements, but if the heat output is not correct, the bridge will become unbalanced and the bridge galvanometer cooperates with a periodically actuated relay to cause motor means to adjust the control valve to correct the heat output, and at the same time a resistance potentiometer mechanically adjusted by the motor rebalances the bridge. This operation is repeated at shortly spaced intervals so as to control the heat output step by step in response to temperature changes inside and outside of the heated space. A special "compensator" comprising simultaneously manually adjusted resistances suitably connected in the bridge is used at special times to increase or decrease the heat output as automatically controlled by the step-by-step adjusting mechanism. Certain indications of the prevailing operations, adjustments, and temperature conditions may be obtained when required, as briefly referred to hereinafter.

The principal object of this invention is to provide an improved controlling and indicating system of the type briefly described hereinabove and disclosed more in detail in the specifications which follow.

Another object is to provide a balanced Wheatstone bridge temperature control system which operates by normally balancing, at intervals, the heat requirements as measured by a resistance thermostat responsive to a controlling temperature against the heat output as measured by other temperature responsive resistances in combination with a valve-adjusting mechanism controlled by the bridge and a bridge-rebalancing resistance simultaneously controlled by the bridge.

Another object is to provide a balanced bridge system of the type just described, provided with a "compensator" for manually and by a single operation increasing or decreasing the amount of change in the rate of heat output per degree change in controlling temperature and also increasing or decreasing the rate of heat output for any given controlling temperature.

Another object is to provide a system which sets the rate of heat supply in accordance with the heat loss through a window as determined from the inner surface temperature of the window, in response to the effect of outside and inside temperature changes, in combination with means for increasing or decreasing this rate of heat supply above or below the automatically determined point.

Another object is to provide a dual potentiometer adapted to adjust the heat output for any given controlling temperature, and also to adjust the rate of change of this heat output for each unit increase or decrease of this controlling temperature.

Other objects and advantages of this invention will be more apparent from the following detailed description of one approved system constructed and operating according to the principles of this invention.

In the accompanying drawings:

Fig. 4 is a chart showing the principle of control carried out by this system.

Fig. 5 is a front face view of the main control panel, partially broken away to indicate some of the concealed controls.

Figure 1:
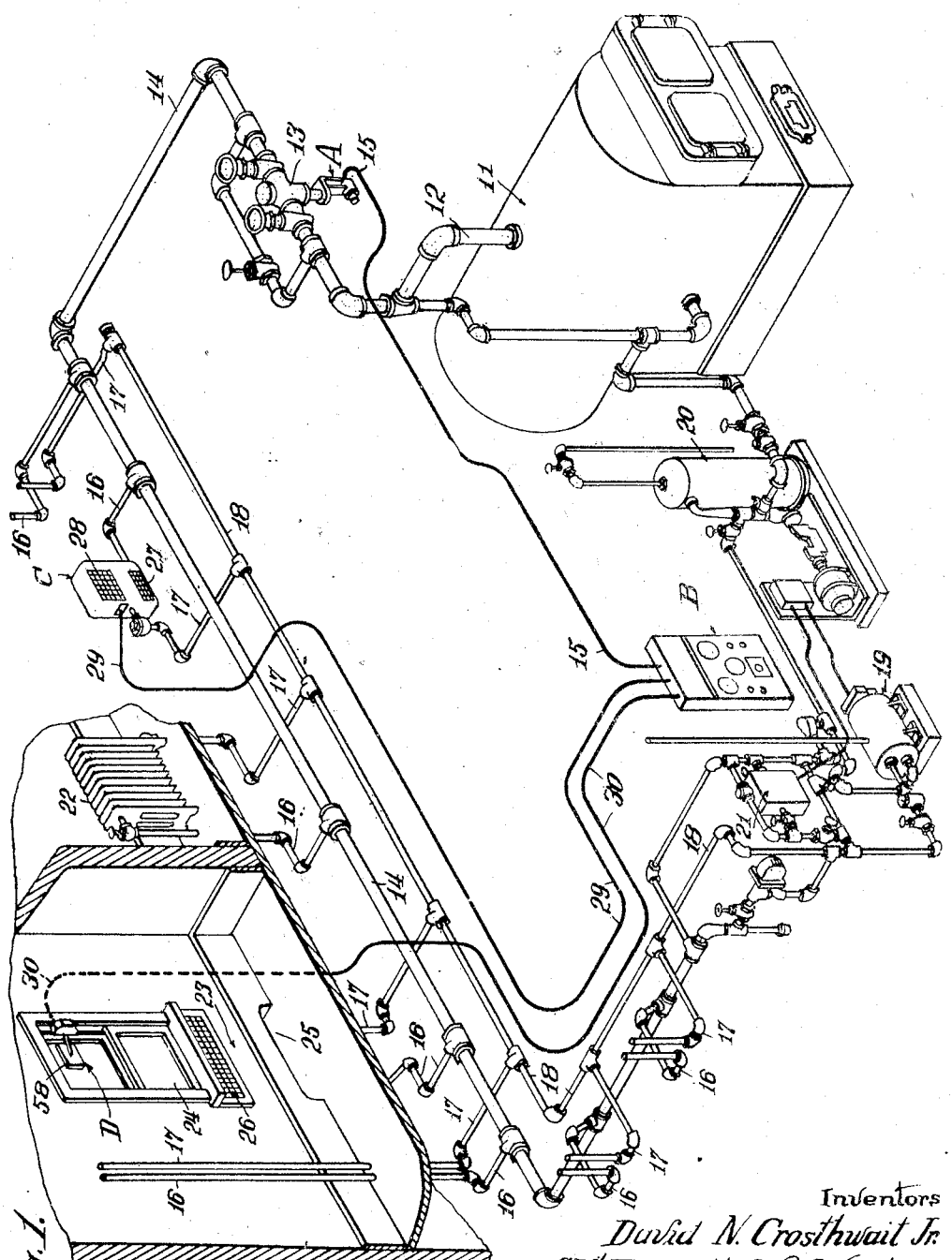
Fig. 1 is a diagrammatic lay-out of a heating system with the improved control and indicating system applied thereto.

Attention is first directed to Fig. 1 which illustrates the application of this improved control system to a heating system of the general type disclosed in the patent to Dunham 1,644,114, granted October 4, 1927. This particular form of heating system is merely shown by way of example, and it will be understood that the improved control mechanism which forms the subject matter of this invention is applicable to other types of heating systems. At 11 is indicated the boiler or generator which supplies steam at sufficiently high pressure through main 12 to the control or reducing valve 13. The motor assembly indicated generally at A automatically modulates the position of valve 13 so as to establish a controlled flow of steam at reduced pressure through the supply main 14. The conduit wires for motor mechanism A extend through cable 15 to the main control panel, indicated at B. Steam flows from supply main 14 through risers 16 to the several individual radiators of the heating system, these radiators being provided with outlet traps through which condensate and air are drawn out through pipes 17 into the return main 18 leading back to the accumulator tank 19. The exhauster mechanism indicated generally at 20, and controlled by the differential pressure-controller 21, functions to help maintain the desired vacuum in the radiators and returns, to withdraw and vent the air or non-condensable gases, and to return condensate to the generator 11. As examples of the types of radiation that may be used, at 22 is indicated an ordinary room radiator, whereas at 23 is located a concealed radiator positioned beneath the window 24 air flowing in from the room through opening 25 thence upwardly in contact with the radiator and the heated air flowing out through grille 26. At C is indicated the "heat-balancer" or device for measuring the heat output from the system, this device as here shown being in the form of a small convector type radiating unit enclosed in a casing through which air flows in at grille 27 and out through grille 28. The thermostatic elements positioned in this heat balancer are connected by conductors extending through cable 29 to control panel B. The construction and operation of this heat balancer will be referred to in more detail hereinafter.

The window-selector D which is responsive to changes in outside, as well as inside temperature, and which will be referred to more in detail hereinafter, is connected through cable 30 with control panel B.

Figure 2:
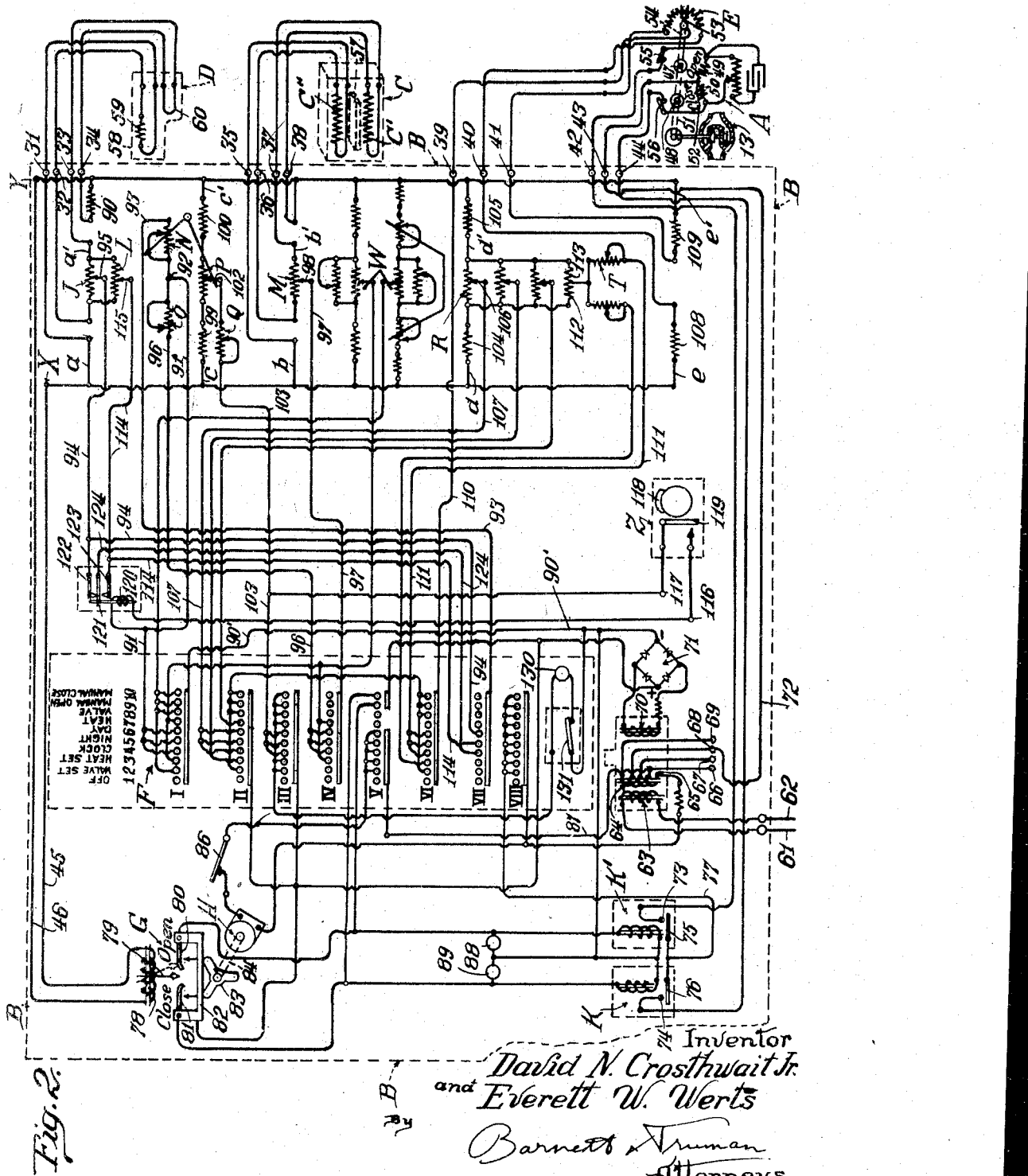
Fig. 2 is a complete wiring diagram of the control system.

Referring now for the moment to Fig. 2, all of the mechanism located in or on the panel B is shown within the space enclosed by the dash line B in Fig. 2, whereas the several control devices A, C and D are indicated diagrammatically at the right of this line in Fig. 2. These devices are connected through terminals 31 to 44 in the panel by a plurality of individual wires or conductors housed in the cables 15, 29 and 30 shown in Fig. 1.

Figure 3:
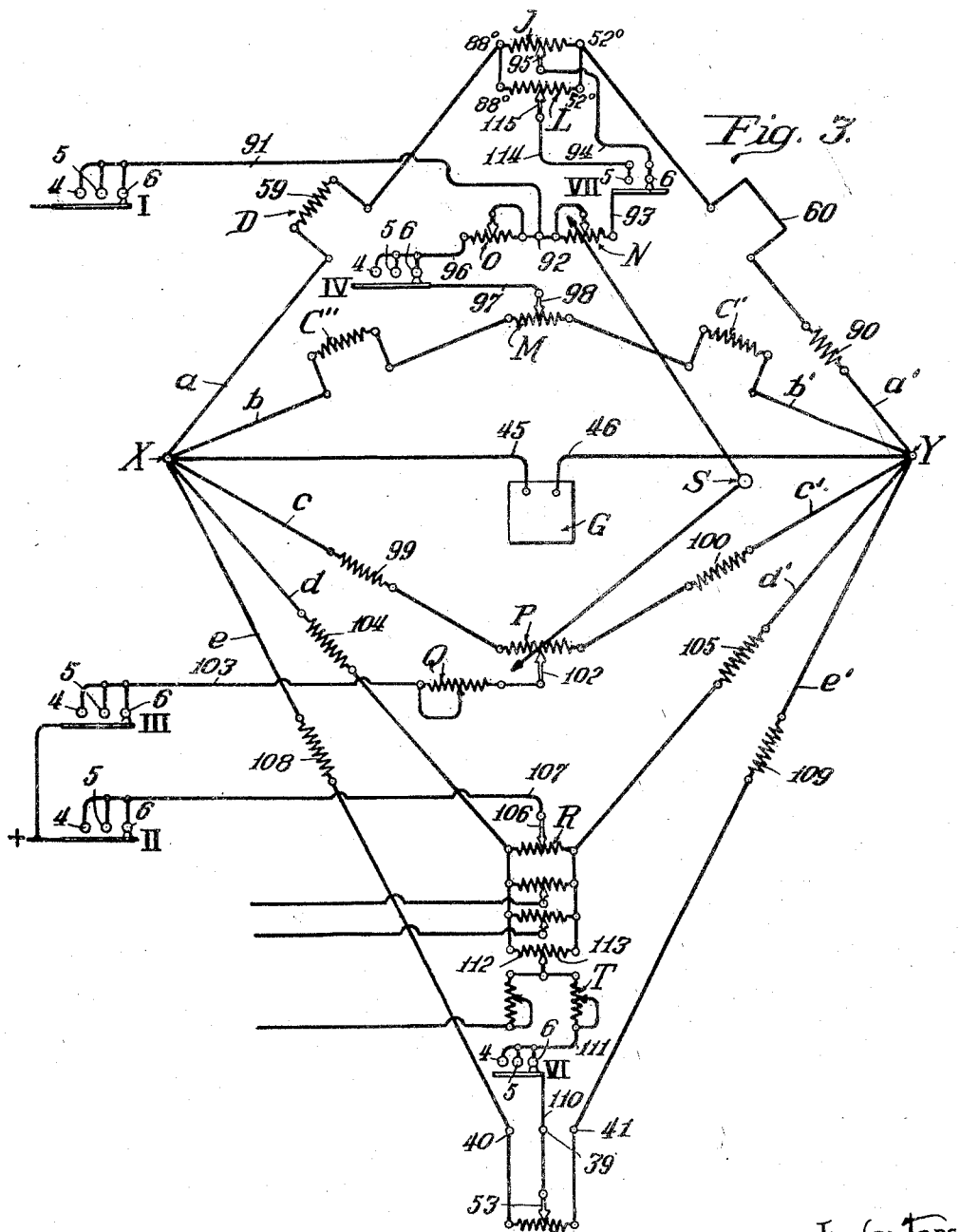
Fig. 3 is an enlarged diagram of the main Wheatstone bridge (as also shown toward the right of Fig. 2) but with the arrangement of the wiring somewhat simplified to give a better indication of the several bridge branches and arms.

Before describing the elements of this control system more in detail, brief reference will be made to the wiring diagram shown in Fig. 3 in order to explain the general principle on which this Wheatstone bridge control system operates. This bridge comprises a plurality of separate branches connected in parallel with a control galvanometer-relay G, connected by wires 45 and 46 across the bridge terminals X and Y. At one side of the bridge there are a pair of branches, one comprising the series connected arms $a$, and $a'$, and the other the series connected arms $b$ and $b'$. The other side of the bridge comprises three branches: one comprising the series connected arms $c$ and $c'$, a second comprising the arms $d$ and $d'$, and a third the arms $e$ and $e'$. All of these branches are connected in parallel across the terminals X and Y. The negative lead from the current source is connected into the junctures of the arms $a$ and $a'$ of one branch and also into the junctures of the arms $b$ and $b'$ of the second branch. Similarly the positive lead from the current source is connected into the junctures of the arms of the three branches at the other side of the bridge. There are various resistances, both fixed and adjustable, and some of these resistances are temperature responsive, positioned in the various arms and in the junctures between the arms. After this bridge has once been properly balanced, it is thrown out of balance by the heat changes to which some of these resistances respond, and is rebalanced either by automatic or manual adjustment, or both, of certain of the other resistances. Meanwhile, while the bridge is out of balance, the galvanometer relay acts to adjust the steam valve or other equivalent means for controlling the flow of heating medium. The same wiring as is shown in the bridge of Fig. 3 is also shown in the control panel of Fig. 2, although the wires are somewhat differently arranged.

Referring now to Figs. 1 and 2, the several instrumentalities not located in or on the control panel B will first be described, these devices being indicated at the right of Fig. 2.

Valve-operating motor

The motor mechanism indicated at A comprises a pair of oppositely rotating motors 47 and 48 provided with fields 49 and 50, respectively, although a single reversible motor could be substituted if desired. These motors are connected through the reduction gearing, indicated diagrammatically at 51, with the modulating valve 13 so that a brief rotation of one or the other of the motors will cause a small adjustment of the valve toward open or closed position. One wire of the motor-actuating circuits extends from the common terminal 52 of the two motors to terminal 43 on panel board B. The other wires of the two motor circuits lead respectively to the panel board terminals 42 and 44. The bridge rebalancing potentiometer E, comprises a movable contact member 53 that is driven at reduced speed from the motor mechanism through the connections indicated diagrammatically at 54. This potentiometer E is located in the lowermost bridge branch e, e' of Fig. 3. Circuit wires extend from the two extremities of resistance E and from the movable contact member 53 to the three terminals 40, 41 and 39 of the panel board. All of these wires are included in the cable 15 of Fig. 1.

A pair of limit switches 55 and 56 are located in the respective actuating circuits of the two motors 47 and 48 so as to break these respective circuits and stop the motor when the valve has been moved to extreme open or closed positions. These limit switches are operated mechanically in a well known manner.

The heat-balancer

The heat-balancer C which has already been briefly described in connection with Fig. 1, comprises a pair of equal heat-sensitive resistances C' and C'' which are positioned respectively below and above the radiator or heating element 57 and in the path of the air stream flowing upwardly through the heat balancer casing from inlet grille 27 to outlet grille 28. The resistances C' and C'' are not only of equal resistance value, but are preferably of the same length and similarly positioned within the air stream with relation to different portions of the radiating element 57. Resistance C' is connected in one arm b' of one branch of the control bridge whereas resistance C'' is connected in the other arm b of this branch. Actually the resistance C' is connected by suitable conductors to the terminals 37 and 38 on the panel board, whereas resistance C'' is connected by similar wires to the terminals 35 and 36. Any difference in the temperatures to which the two resistances are subjected will thus cause a resistance change or unbalance in the two arms of the bridge. A heat balancer of this type is preferable to one utilizing a single thermostat or single temperature responsive resistance. By utilizing the difference in the two resistances C' and C'' as a measure of the heat-output, any variation in the temperature of the air entering the heat-balancer is automatically compensated for. Also, in extremely mild weather when the heat-output should be quite small and changes in heat-output are difficult to measure, this resistance-differential method of measuring the heat output is more efficient. Under such conditions the radiating element 57 may be only partially filled and different portions thereof will have different temperatures. However, since the resistance elements are similarly positioned with respect to the air stream so as to compensate for temperature differences at various locations in the radiator, the heat balancer directly measures the temperature change in the air stream as the result of heat imparted thereto by the radiator and this is the logical and most effective way of measuring the heat-output. It will be noted that since the two resistances C' and C'' are connected in opposite arms of a branch of the control bridge and connected with the control panel by a four wire coded cable 29 (Fig. 1), the resistances of the leads extending to the heat balancer are automatically compensated for.

Window-thermostat

The window-thermostat D (Figs. 1 and 2) or "selector" is adapted to directly respond to the effect within the building of outside temperature and weather changes. The heat-sensitive resistance 59 of this thermostat is housed within a casing 58 (Fig. 1) supported in contact with the inner surface of the glass of an outside window. It is arranged to respond quickly to outside temperature changes as transmitted through the window and less rapidly to inside temperature changes, thus quickly measuring the rate of heat loss, as partially or wholly compensated for by the changing heat-output from the radiators. The heat-sensitive coil 59 is connected to terminals 31 and 32 on the panel board. A balancing loop 60 in casing 58 is similarly connected to terminals 33 and 34 on the panel board. It will be understood that the heat-sensitive resistance D and the balancing loop 60 are positioned in opposite arms of a bridge control branch (a and a', Fig. 3), as will be hereinafter further described. The thermostat is connected with the control panel by means of a four-wire coded cable 30 (Fig. 1) so as to automatically adjust the length and resistance of the balancing loop.

Means are preferably provided for yieldably holding the window-thermostat D in engagement with the inner surface of the window pane, as well as for automatically moving the thermostat out of engagement with the window as the window is opened or closed. This mechanism is not here shown in detail, but is shown and claimed in a copending application of the same inventors, Serial No. 236,825, filed October 24, 1938, Patent No. 2,346,560. The specific construction of the "selector" is also disclosed in said copending application.

In short, this selector responds promptly to any variations in a controlling temperature which is determined by outside weather conditions, and also less promptly to changes in the inside temperature adjacent this selector as determined by the heat-output or supply in the enclosure.

Control-panel

Some of the elements of the main control panel B will now be described, beginning with the master control switch F, the manual controller for which is shown in Fig. 5, and the constituent components of which are indicated within broken lines shown at F in Fig. 2. This switch is of the so-called "multiple-gang" type already known, one suitable example of this switch being disclosed in detail in our copending application Serial No. 236,824, filed October 24, 1938, Patent No. 2,362,977. This switch comprises eight separate but simultaneously operated "decks" of switches indicated by the Roman reference numerals I to VIII in Fig. 2. The several decks are all substantially alike, each comprising ten separately spaced contacts and a single contact adapted to be connected alternatively with one or more of these separate contacts as the switch is rotated to any one of its ten positions, indicated by the Arabic numerals 1 to 10, respectively. Suitable means is provided for locking this switch in any one of its ten positions. In each separate position of this main switch some separate function or mode of operation of the controller is to be performed (with the exception of position 1, which is the "off" position), these several functions being indicated by the legends at the top of the diagrammatic showing in Fig. 2 and also being indicated on the controlling dial shown in Fig. 5. The positions in which we are mainly concerned in this application are positions 4, 5 and 6 corresponding to "clock," "night" and "day," these being the normal operating positions. The other positions will be referred to briefly hereinafter.

Returning now to Fig. 2, the alternating current supply mains 61 and 62 are shown in the lower left hand portion, these mains extending to the primary 63 of a transformer. One secondary coil 64 of this transformer is provided with a series of taps 65 to 69 inclusive, from which the appropriate alternating current is taken off for operating the timing motor H, and the valve-operating motor A. Another secondary 70 of this transformer supplies current to the rectifier 71 which in turn supplies direct current for operating the several bridge circuits and relays hereinafter referred to.

At K and K' are indicated the relays for closing the energizing circuits for valve-closing motor 48 and valve-opening motor 47, respectively. A wire 72 leads from one terminal 68 of transformer secondary 64 to the panel terminal 43 and thence to the common terminal 52 of the two valve operating motors. Wires lead from the other terminals of these motors to panel terminals 42 and 44 and thence to the fixed contacts 73 and 74 of the relays K' and K respectively. When relay K' is energized a movable contact 75 is drawn into contact with fixed contact 73, and in the same manner when relay K is energized a movable contact 76 is engaged with fixed contact 74. These movable contacts 75 and 76 are connected through wire 77 with the deck VIII of switch F and thence with the other terminal 65 of secondary 64. When relay K is energized, the motor 48 will be actuated to close the valve, and similarly when relay K' is operated the motor 47 will be energized to open the valve.

The galvanometer relay G is of known type and is here shown diagrammatically. The usual highly sensitive galvanometer coil 78 which swings the indicating needle 79 in one direction or the other as the potential-difference varies across terminals X and Y of the Wheatstone bridge is connected with these terminals through wires 45 and 46 as already described. A pair of normally open switches 80 and 81 are carried by a movable support 82 which is adapted to be lifted or moved toward the needle 79 by suitable periodically actuated means, such as the rotary cam 83. In the example here shown, this cam comprises three arms and is adapted to be rotated once a minute by the small synchronous motor H through connections 84. The energizing circuit for motor H extends from terminal 65 of secondary 64 to the motor H, manually operated switch 86, deck V of main switch F, thence through wire 87 to the other terminal or tap 66 of secondary 64. The circuit will remain closed until the main switch F is moved to the "off" position or to one of the non-automatic positions 7, 8, 9 or 10, at which time the motor circuit will be broken at deck V of master switch F. The motor H can also be stopped at any time by opening normally closed switch 86. The cam 83 will act to lift the frame 82 three times every minute. If the bridge is in proper balance, that is, if the correct amount of heat is being supplied to the enclosure, the needle 79 will hang in the vertical position as shown and when frame 82 is lifted, the needle will not engage either of the movable contacts of switches 80 and 81. Assuming, however, that there is a need of more heat, and the bridge is consequently unbalanced so that needle 79 will swing to the right, as indicated in dotted lines, this needle will engage over the movable contact switch 80 and press this contact downwardly into engagement with the fixed contact so as to close the switch and thereby complete a circuit actuating the relay K' as follows: from the positive terminal of rectifier 71 direct to the fixed contact of switch 80 and thence to the coil of relay K' and to the negative terminal of rectifier 71. The energizing of relay K' will cause the motor 47 to be actuated to increase the valve opening and increase the heat output. On the other hand, if there is excessive heat output the needle 79 will swing to the left so as to close switch 81 and energize relay K in a similar manner to cause motor 48 to be actuated to partially close the valve 13. Each of these operations will take place for a brief period of time only so as to give only a slight adjustment to the valve 13 and each operation will repeat itself three times every minute. The interval between valve actuations gives sufficient time for the valve adjustment to take effect by increasing or decreasing the heat output, and when a satisfactory adjustment has been reached the needle 79 will remain in vertical position so that no valve adjustment will occur when the frame 82 is lifted by cam 83.

A pair of signal lamps 88 and 89 (see also Fig. 5) are connected in parallel with the relays K' and K so as to indicate on the face of the panel board whether the valve is being opened or closed, if either.

Day temperature automatic control

It will be assumed, for the present, that the master switch F is moved to position 6, thus setting the apparatus for the usual day temperature automatic operation which will first be described. In other words, the switch contacts in column 6 of each of the decks of the gang switch F will be closed. The Wheatstone bridge shown in Fig. 3 will now be described more in detail, it being remembered that the same parts are shown in Fig. 2 and indicated by the same reference characters.

Referring again to Fig. 3, the uppermost branch is the "selector" branch comprising the temperature responsive resistance 59 of selector D positioned in arm $a$, and the compensating conductor loop 60, together with the fixed resistance 90 positioned in the other arm $a'$. The juncture of the arms $a$ and $a'$ is through the alternative adjustable centering potentiometers J and L which are provided with dials calibrated in degrees of temperature at the selector coil and are used as the cut-off temperature adjustment for "day" and "night" control, respectively. The marking in degrees at each end of the potentiometer resistance indicates the range of the calibrated scale of each in Fig. 3. This, of course, is only by way of example.

The heat-balancer branch consists of the arm $b$ with the heat-responsive resistance C'' therein, and the arm $b'$ with the heat responsive resistance C' therein, the two arms being coupled by the centering adjustment potentiometer M.

With the master switch F set at "day" control, the current will flow from the negative terminal of rectifier 71 through wire 90', contacts at position 6 of deck I of master switch F, thence through wire 91 to the terminal 92 between adjustable potentiometers N and O of the Wheatstone bridge. From terminal 92 one branch of the circuit flows through adjustable potentiometer N, wire 93, contacts 6 of deck VII of the master switch, thence through wire 94 to the sliding contact 95 of the centering adjustment potentiometer J. Another branch of this circuit flows from terminal 92 through adjustable potentiometer O, wire 96, contacts 6 of deck IV of the master switch, thence through wire 97 to the sliding contact 98 of potentiometer M connecting the arms $b$ and $b'$ of the "heat-balancer" branch of the bridge.

At the other side of the bridge the branch arms $c$ and $c'$ contain the fixed resistances 99 and 100, respectively, and these arms are coupled by the centering potentiometer P. The resistances N and P are comprised in a dual potentiometer S (see also Fig. 5). By manual manipulation of the control knob 101 of this compensator, on the panel board, certain temporary manual adjustments of the heat-output can be made, as will be hereinafter described. The sliding contact 102 of potentiometer P is connected through adjustment resistance Q and wire 103 with the contacts 6 of deck III of the master switch F and thence to the positive terminal of the rectifier 71. The arms $d$ and $d'$ containing respectively the resistances 104 and 105 are connected by the centering potentiometer R to form another branch of the bridge. Slidable contact 106 of potentiometer R is connected by wire 107 to the contacts 6 of deck II of the master switch and thence to the positive terminal of the rectifier. The third branch at this positive side of the bridge comprises the two arms $e$ and $e'$ containing respectively the fixed resistances 108 and 109, these arms being connected respectively to the terminals 40 and 41 on the panel board and thence to the respective ends of the potentiomter E which is automatically adjusted by the valve operating motor A. The sliding contact 53 of this potentiometer is connected to panel terminal 39 thence through wire 110 to contacts 6 of deck VI of the master switch, thence through wire 111 to the adjustable potentiometer T to the juncture between fixed resistances 112 and 113 and thence to the respective ends of centering potentiometer R.

Several other fixed and adjustable resistances are shown in Figs. 2 and 3 to form alternative branches of the bridge but these need not be here described in detail. These form parts of other bridge combinations used when the master switch is turned to positions 2, 3, 7, 8, 9 and 10. These will be briefly referred to hereinafter, and are described in detail in the copending application of the same inventors, Serial No. 236,824, hereinabove referred to.

Referring now briefly to the chart shown in Fig. 4, the horizontal lines represent the rate of heat output in percentage of the system heating capacity. In other words, the bottom horizontal line represents no heat output from the radiators, whereas the top horizontal line represents 100 per cent heat output. The vertical lines represent outdoor temperatures (assuming the indoor temperature to be constant), or substantially the controlling temperature which affects the selector D. The three sloping lines represent the rate of heat output corresponding to any given controlling temperature, the central one of these lines being the heat line that will normally be maintained when the "compensator" is set at 0 and all of the other substantially fixed adjustments have been made for the particular building in which the control system is installed. It will be noted from this heat line that for a controlling temperature of 70° there is no heat output, that is, the heat responsive resistances C' and C'' will respond to the same temperature. For a controlling temperature of 10° there will be a rate of heat output of approximately 41 per cent. The rising inclination of this heat line, which will be hereinafter referred to as its "slope," indicates the relative increase in rate of heat output for each degree change in outdoor temperature. The greater the inclination of this line with respect to the horizontal, the greater the increase in heat-output for each degree drop in outdoor temperature. The point at which this sloping heat line intersects the zero "rate of heat-output" line is known as the "intercept." As already stated, this is the lowest temperature at which there is no heat-output required. It will be noted from Fig. 5 that the dial of the compensator S is graduated from a zero central position to a maximum of 5 in each direction. In Fig. 4, if this compensator is set at "5 higher" the heat line will have an "intercept" of 80, that is, the rate of heat-output will be zero at a controlling temperature of 80° (instead of at 70° as under normal operation). It will also be noted that the slope of this upper heat line increases the rate of heat-output more rapidly for each degree drop in the controlling temperature. For example, at a controlling temperature of 10°, the rate of heat-output will be about 77 per cent instead of 41 per cent, as in normal operation. On the other hand, if the compensator is set at "5 lower" the intercept will be at 60° controlling temperature, and at a temperature of 10° the heat line indicates a rate of heat-output of approximately 25 per cent of the total heating capacity. The normal heat line indicates the rates of heat-output for each outside temperature that experience has found to be best under normal conditions for any given installation. The "compensator" is to be used at the discretion of the operating engineer to temporarily reset the apparatus to meet special conditions, as for example to more rapidly heat up the building in the early morning. It is desirable at such times to change the "intercept" as well as the "slope" of the heat line, and these adjustments are made simultaneously and in proper proportion by the single adjustment of the manually operated "compensator."

Referring now again to Fig. 3, it will be noted that in the compound bridge arm between the negative current lead and the branch junction X the current path through potentiometer N and the selector D is in parallel with the current path through the adjustable resistance O and the heat-balancer coil C''. When the bridge has been thrown out of balance by a reduction in the resistance of the selector coil as a result of a fall in outdoor temperature, it will be brought back into balance by an increase in the resistance of the heat balancer coil C'' in the parallel path by an increase in the supply of heat to the heat balancer. Thus by maintaining a correct supply of heat to meet the controlling temperature conditions, the bridge will be kept in balance. The controlling bridge varies the heat supply in relation to the outdoor temperature in the manner represented by the heat lines shown on the chart in Fig. 4 and already described.

The adjustable resistance O in the current path to the heat balancer bridge branch regulates the amount of current flowing in the heat balancer branch relative to the current flowing in the selector branch, and thus the relative effect of temperature changes at the selector and heat balancer coils is varied. Adjustment of the resistance O determines the change in temperature difference at the heat balancer required to rebalance the bridge for any given change in temperature at the selector D. Consequently an adjustment of this ratio by the resistance O will vary the slope of the heat line. The adjustment of resistance O is a concealed adjustment set to establish the normal slope of the heat line, whereas the adjustable potentiometer N is connected in the current passed through the selector so that changes in its adjustment will also have the effect of varying the slope of the heat line. This potentiometer N is in one section of the "compensator," and as already noted is an adjustment accessible on the front of the panel board and used for manually increasing or decreasing, by a limited amount, the supply of heat at any existing outdoor temperature.

When no heat is being supplied to the heat balancer, both of its coils are at the same temperature and the temperature of the selector coil D required to bring the bridge into balance is determined by the setting of the centering potentiometer J. The setting of J determines the "intercept" of the heat line, that is, the temperature of the selector coil at which the bridge is in balance with no heat output. Centering adjustment potentiometer M is used in making the initial adjustments so as to match the heat balancer branch with the selector branch so that with the heat balancer coils at the same temperature and the selector coil at the temperature for which potentiometer J is set, variations in the settings of adjustable resistances O and N will not disturb the balanced condition of the bridge. Thus the slope and the intercept adjustments are made independent.

In the side of the bridge to which the positive current lead connects, potentiometer R is an uncalibrated centering adjustment used to initially match this side of the bridge with the heat balancer and selector side. The potentiometer E (operated by the valve motor) is also a centering adjustment. If the bridge is unbalanced a small amount by the temperatures at the selector and heat balancer coils, it may be brought back into balance by change in the setting of this balancing potentiometer E operated by the valve motor. The change in valve opening made as the result of an unbalanced condition in the bridge is always in the direction such that the accompanying change in the setting of the potentiometer E tends to restore the bridge to balance. The adjustable resistance T is in the current path to the balancing potentiometer E so that changes in the setting of T result in changes in the current flowing to this branch, thereby varying the amount of rebalancing effect corresponding to a given adjustment of E. This T adjustment is called a "temperature differential" adjustment and it is calibrated to give the effect or power of the balancing potentiometer E expressed in degrees change in the temperature difference of the heat balancer coils C' and C''.

The adjustable potentiometer P is the second section of the manual "compensator" adjustments. This potentiometer P is connected as a centering adjustment in the bridge so that it has an effect similar to potentiometer J and shifts the "intercept" of the heat line. The amount of intercept shifting effect given by the compensator is determined by the setting of the adjustable resistance Q in the current path to the potentiometer P.

Night automatic temperature control

For the night control master switch F is moved to position 5. The negative current supply lead now extends as before from the rectifier through deck I of the bridge through potentiometer N to deck VII of the bridge, but now flows through contact 5 of deck VII and through wire 114 to the slidable contact 115 of centering potentiometer L. The only change in the bridge is to substitute this potentiometer L for the "day" potentiometer J. The potentiometer L is set for lower temperatures than the potentiometer J so that a lower scale of heat output is maintained at night.

Clock control

When master switch F is moved to position 4 for clock control, the system is automatically shifted from automatic day control to automatic night control and then back again to automatic day control at certain selected hours. A suitable clock Z is here indicated as located on the lower central portion of the panel board, although preferably this clock, if used, will be a separate instrument connected with the panel board terminals 116 and 117. The clock comprises a rotating cam 118 of such length that it will engage and close the switch 119 during certain specified hours of the night. In other words, the cam 118 makes one complete revolution in 24 hours. When switch 119 is closed by the clock, a circuit is closed from the positive terminal of rectifier 71 through deck III of master switch F to panel terminal 117, switch 119, panel terminal 116, solenoid 120 (top of Fig. 2) to deck I of the master switch F and thence back to the negative terminal of the rectifier. At this time the energized solenoid 120 will draw down the movable contact 121 so as to open the normally closed switch 122 and close the normally open switch 123. The current will now flow as before to deck VII of switch F, thence through contact 4 of the switch, wire 124, switch 123 and wire 114 to the "night" centering potentiometer L. During the "day" hours, when switch 119 is open and solenoid 120 is deenergized, the switch 122 will be closed. At such times the current will flow back from deck VII through contact 4 of this deck, wire 124, switch 122, and wire 94 to the "day" centering potentiometer J.

*Other bridge operations*

Besides the three automatic control positions already described in detail, and the "off" position 1, the master switch may be moved to six other operative positions (2, 3, 7, 8, 9 and 10). These involve several different branches that may be used in the bridge, and alternative hook-ups which will not be here disclosed in detail. A more complete description of these controls have been disclosed and claimed in the copending application of the same inventors Serial No. 236,824, hereinabove referred to, and the same need only be briefly described here. If master switch F is set to the position 2, the bridge will be utilized to automatically set the valve opening to a selective position determined by the manual setting of the potentiometer W (see Fig. 5), if the switch F is set to position 3, the potentiometer W is used to set the apparatus for a fixed rate of heat supply. In order to rapidly open or close the valve, the master switch F is set to either position 9 or position 10. In order to read the rate of heat supply at the panel, the master switch is set to position 7 and the "valve and heat" knob W is adjusted to bring the galvanometer needle to the center. The rate of heat supply can then be read on the "valve and heat" dial as a per cent of the system's heating capacity. In order to read the degree of valve opening from the panel, this knob W is turned until the galvanometer needle is centered after the master switch has been set at position 8. The dial of W will then read the percentage of valve opening.

Referring now to Fig. 5, the master switch F, the compensator S, and the "valve and heat" potentiometer W have conveniently operable knobs 125, 101 and 126 rotatably positioned on the face of the panel board B. Each of these knobs comprises an indicating mark or arrow cooperating with the fixed dials on the face of the panel. Ordinarily knob 125 will be turned so that the master switch is moved to position 4, 5 or 6 for usual automatic operation. If any temporary adjustments are to be made to increase or decrease the heat output, this is done by manipulation of knob 101 of the compensator, it first being necessary to operate a release button 127 which normally holds this compensator in centered or zero position. If the master switch is moved to positions 2 or 3 or positions 9 or 10, the dial 126 of potentiometer W is adjusted to the proper percentage mark to indicate the valve opening or heat output desired. If the master switch F is moved to positions 7 or 8 to get a heat-output indication or a valve setting indication, the potentiometer W is adjusted until the needle 79 of the galvanometer is centered, as observed through the window 128, whereupon the heat output or valve setting may be read on the dial adjacent the knob 126.

The more or less fixed adjustments for the various resistances, such as the centering adjustments J and L, are located under a removable panel 129 at the upper end of the panel board.

The signal lamps 88 and 89 for indicating whether the valve is being opened or closed at any given time have already been referred to. Also located on the upper portion of the panel, between the dials F and S, is a flasher light 130. This will be found in Fig. 2 directly beneath the master switch assembly. A current for energizing this light flows from rectifier 71 through a thermostatic circuit breaker 131 and thence through light 130 and deck III of master switch F. It will be noted that when the master switch is in any of the "non-automatic" positions, that is, any position other than the "off" position or the normal clock, night or day positions, the signal light 130 will be energized at short intervals, the energizing circuit being broken as thermostat 131 becomes heated and again energized as this thermostat cools off. This flashing light is a signal to the operator that the apparatus has been left in some position other than the normally desired automatic heat control positions.

It will be noted that the motor-operated proportioning potentiometer E is located in a branch of all of the automatic control circuits, this resistance being adjusted in accordance with the degree of valve opening and thereby rebalancing the bridges as the valve is adjusted, thus preventing any over-adjustments of the valve opening. This provides for a true modulating or proportioning adjustment of the control valve so that the valve can be accurately positioned to maintain a steady rate of heat output just sufficient to offset the prevailing heat losses. Also timing the valve adjustments at short spaced intervals and providing a substantial pause between each increment of adjustment so that the adjusted rate of heat-output will have an opportunity to take effect within the building before an additional adjustment is made, guards against over-shooting and consequent repeated and unnecessary opening and closing of the control valve.

It will be noted that in the preferred form of bridge circuits here shown, the current leads are switched instead of the galvanometer leads. In other words, the galvanometer connections across the terminals X and Y are permanently connected whereas the connections from the source of power to the other terminals of the bridge (that is, the junctures of the bridge arms) extend through adjustable resistances and alternative switch connections. This tends toward greater accuracy, since the minutely fluctuating current through the galvanometer flows through a permanently fixed path. However, the galvanometer connections and the power connections could be reversed, that is, the power could be connected across the terminals X and Y and the galvanometer alternatively connected across the different junctures of the bridge arms. It is to be understood that one of these circuits is to be considered as the equivalent of the other as far as the following claims are concerned.

Preferably the internal design of valve 13 is such that equal amounts of change from a given position result in a substantially uniform percentage of change in valve area from the area at said given position.

We claim:

1. An automatic temperature control apparatus which selects the rate of heat output of the heating system, comprising a balanced bridge circuit consisting of two groups of parallel branches, each branch comprising a pair of series connected resistance arms, a source of current connected across the junctures of the arms of the two groups of branches, a galvanometer connected in parallel with the branches and means comprising a periodically actuated relay set by the galvanometer for increasing or decreasing by successive increments the heat output in response to an unbalanced condition of the bridge, a heat responsive resistance in an arm of one branch of the bridge responsive to changes in the temperature adjacent the inner surface of an outside window, heat responsive resistance means in another branch responsive to changes in heat output, adjustable centering resistances between the arms of each branch, one of the power connections leading to the central contact of each centering resistance, a compensator comprising an adjustable potentiometer in the power lead extending to the arm containing the first mentioned heat responsive resistance, and another adjustable potentiometer connecting the arms of another branch of the bridge, the compensator being normally operable to simultaneously adjust the two potentiometers to increase or decrease the heat output for any given window temperature, and simultaneously increase or decrease the rate of heat output per degree change in window temperature, a resistance connecting the two arms of another branch of the bridge, and a contact forming part of the connections with the source of power and mechanically moved along the resistance by the heat output adjusting means so as to divide the resistance between the arms proportionate to the changes made in the heat output to restore the balance of the bridge.

2. An automatic temperature control apparatus which selects the rate of heat output of the heating system, comprising a steam flow control valve, a balanced bridge circuit consisting of two groups of parallel branches, each branch comprising a pair of series connected resistance arms, a source of current connected across the junctures of the arms of the two groups of branches, a galvanometer connected in parallel with the branches, and means comprising a periodically actuated relay set by the galvanometer, and a valve-operating motor mechanism controlled by the relay for increasing or decreasing by successive increments the valve opening in response to an unbalanced condition of the bridge, a heat responsive resistance in an arm of one branch of the bridge responsive to changes in the temperature adjacent the inner surface of an outside window, heat responsive resistance means in another branch responsive to changes in heat output, adjustable centering resistances between the arms of each branch, one of the power connections leading to the central contact of each centering resistance, a compensator comprising an adjustable potentiometer in the power lead extending to the arm containing the first mentioned heat responsive resistance, and another adjustable potentiometer connecting the arms of another branch of the bridge, the compensator being manually operable to simultaneously adjust the two potentiometers to increase or decrease the heat outut for any given window temperature, and simultaneously increase or decrease the amount of change in the rate of heat output per degree change in window temperature, a resistance connecting the two arms of another bridge branch, and a contact forming a part of the connections with the source of power and mechanically moved along the resistance by the valve-operating motor mechanism so as to divide the resistance between the arms in proportion to the changes in valve-opening to restore the balance of the bridge.

3. An automatic temperature control apparatus which selects the rate of heat output of the heating system, comprising a steam flow control valve, a balanced bridge circuit consisting of two groups of parallel branches, each branch comprising a pair of series connected resistance arms, a source of current connected across the junctures of the arms of the two groups of branches, a galvanometer connected in parallel with the branches, and means comprising a periodically actuated relay set by the galvanometer, and a valve-operating motor mechanism controlled by the relay for increasing or decreasing by successive increments the valve opening in response to an unbalanced condition of the bridge, a resistance in an arm of a bridge responsive to temperature changes adjacent the inner surface of an outside window as a measure of heat losses from a space, a compensating fixed resistance in the other arm of this bridge, an adjustable centering resistance between the arms, like resistances in the two arms of another branch, one positioned below and the other above one of the heat-exchangers which impart heat to the space, an adjustable centering resistance between the arms of this branch, one power lead from the source of current having branches extending to the two centering resistances respectively, an adjustable resistance in one of these branch leads, a compensator in the form of a dual-potentiometer, one of the potentiometers being connected in the other branch power-lead and the other potentiometer connecting the arms of a bridge branch at the other side of the bridge, an adjustable centering resistance between the arms of another branch at this latter side of the bridge that is mechanically adjusted by the valve-operating mechanism to divide the centering resistance between the arms in proportion to the changes in valve-opening to restore the balance of the bridge, the other power lead comprising branch leads connecting respectively to the second potentiometer of the compensator and to the last-mentioned mechanically adjusted resistance, and adjustable resistances in each of these branch leads.

4. An automatic temperature control apparatus which selects the rate of heat output of the heating system, comprising: a balanced bridge circuit consisting of two groups of parallel branches, each branch comprising a pair of series connected resistance arms; a source of current having power connections with the junctures of the arms of the two groups of branches; a galvanometer connected in parallel with the branches; heat adjusting means including a periodically actuated relay controlled by said galvanometer for adjusting the heat output in a direction to correct an unbalanced condition of the bridge at each periodic operation of said relay; a heat responsive resistance in an arm of one branch of the bridge responsive to changes in the temperature adjacent the inner surface of an outside window; heat responsive resistance means in another branch responsive to changes in heat output; adjustable resistances at the juncture of the arms of each branch, said power connections leading to said adjustable resistances; a compensator having an adjustable potentiometer in the power connection extending to the arm containing the first mentioned heat responsive resistance, and another adjustable potentiometer in the other power connection to the arms of another branch of the bridge, said compensator being manually operable to adjust said potentiometers simultaneously to regulate the heat output; a resistance connecting the two arms of another branch of the bridge; and a contact connected to one of said power connections and movable along said resistance by said heat output adjusting means to divide the resistance between the arms and restore the balance of the bridge.

DAVID N. CROSTHWAIT, JR.
EVERETT W. WERTS.

REFERENCES CITED

The following references are of record in the file of this patent:

UNITED STATES PATENTS

| Number | Name | Date |
|---|---|---|
| 1,651,440 | Campbell | Dec. 6, 1927 |
| 1,759,996 | Parker | May 27, 1930 |
| 1,769,358 | Pinkerton et al. | July 1, 1930 |
| 1,795,753 | Bonn | Mar. 10, 1931 |
| 2,012,285 | Otis | Aug. 27, 1935 |
| 2,060,265 | Thomas | Nov. 10, 1936 |
| 2,136,559 | Miller | Nov. 15, 1938 |
| 2,137,059 | Moreau | Nov. 15, 1938 |
| 2,144,105 | Coleman | Jan. 17, 1939 |
| 2,153,922 | Green et al. | Apr. 11, 1939 |
| 2,170,072 | Hartig | Aug. 22, 1939 |
| 2,189,462 | Donle et al. | Feb. 6, 1940 |
| 2,236,624 | Littwin | Apr. 1, 1941 |
| 2,246,575 | Coleman | June 24, 1941 |
| 2,279,582 | Russel | Apr. 14, 1942 |
| 2,362,977 | Crosthwait et al. | Nov. 21, 1944 |

FOREIGN PATENTS

| Number | Country | Date |
|---|---|---|
| 343,017 | Great Britain | Jan. 28, 1931 |